INVENTORS.
Keiji Okaniwa
Isao Takatama
Shigeru Maehara
Isoji Igarashi

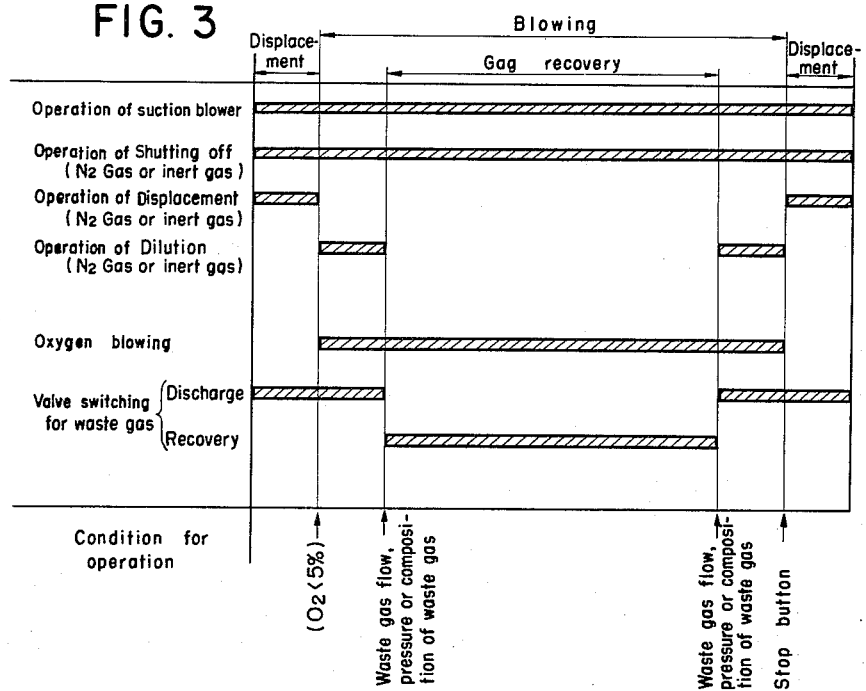
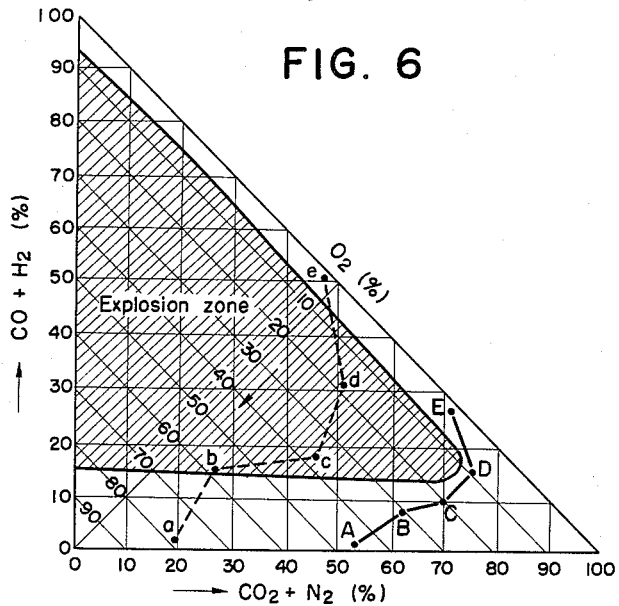

United States Patent Office 3,220,826
Patented Nov. 30, 1965

3,220,826
METHOD AND APPARATUS FOR RECOVERING WASTE GAS FROM OXYGEN TOP BLOWING CONVERTER IN UNBURNED STATE
Keiji Okaniwa and Isao Takatama, Yokohama, and Shigeru Maehara and Isoji Igarashi, Kitakyushu, Japan, assignors of fifty percent to Yawata Iron & Steel Co., Ltd., Tokyo, Japan, and fifty percent to Yokoyama Engineering Co., Ltd., Tokyo, Japan
Filed Jan. 22, 1965, Ser. No. 427,331
Claims priority, application Japan, Feb. 10, 1961, 36/4,549; Apr. 10, 1961, 36/12,765; May 19, 1961, 36/17,836, 36/17,837
4 Claims. (Cl. 75—60)

This application is a continuation-in-part of our application Serial No. 171,031, filed February 5, 1962, now abandoned.

The present invention relates to method and apparatus for recovering unburned waste gas generated in and issuing from an oxygen top blowing converter, and more particularly to a method by which only the waste gas containing a relatively high amount of CO can be recovered.

It has long been known that the waste gas from a large size converter contains CO in an amount up to about 80–90% and this gas has an inestimable potential value because it can be used, after being cooled to a normal temperature and properly cleaned, as a useful raw material in the chemical industry.

This waste gas from the converter, however, is liable to cause an explosion if it comes into sudden contact with air, and so it is indispensible that steps be taken to prevent an explosion so that the operation of the converter will be safe and also for protection of the waste gas recovering equipment.

In reference to the terms used in this specification by, "pure oxygen" is meant industrial grade oxygen, by "gas recovery operation" is meant a waste gas recovery operation for a pure oxygen top blowing converter operation, and by "sequence" is meant the order of the steps in the gas recovery operation.

In processes of recovering for use as a raw material in the chemical industry, the gas generated by blowing in a pure oxygen top blowing converter, the most careful attention must be given to the prevention of explosion, gas leakage and deterioration of the contents or composition of the gas. For these reasons, the gas recovery operation must be caired out in a particular way and in a particular sequence, or order of steps. In the initial stage of oxygen blow-in during refining in a top blowing converter, the CO content of the waste gas generated tends to increase rapidly from 0%, and in the final stage of such refining, the CO content tends to drop rapidly towards 0%. On the other hand, the oxygen content of the waste gas tends to drop rapidly from the maximum in the initial stage of blow-in during refining, and to increase rapidly from the minimum in the final stage of the refining. The reason for this is that it is thought that in the initial stage of blowing the decarburation reaction in the molten iron is delayed and the CO content of the waste gas is low, and on the other hand, unreacted $O_2$ is discharged along with the waste gas, and the oxygen content is therefore high. In the final stages of the refining, on the other hand, the carbon in the molten iron will have been almost consumed by the reaction and unreacted blown-in oxygen will be present and will be mixed in with the waste gas thereby increasing the oxygen content thereof. If the oxygen content increases to a certain extent above the CO lower limit of the explosive mixture range, it is liable to touch off a drastic reaction with the CO in the waste gas, thus causing an explosion.

The waste gas generated in the converter is cooled in a gas cooler, and the cooled gas is drawn through a dust collector and by a suction fan. Only the waste gas which has a high CO content is stored in a gas container, and the waste gas which has a low CO content which is generated in both the initial and final stages of the blowing is discharged from a burning tower or stack into the atmosphere. In this waste gas recovery system, the most important operation is the waste gas pressure control in the gas cooler by means of a gas flow control valve.

Consequently, if this gas flow control valve fails to work properly because it does not have good sensitivity or for some other reason, good control of the waste gas pressure in the gas cooler will be lost and may cause leakage of waste gas into the atmosphere from the covered converter throat and the bottom part of the gas cooler, or atmospheric air will flow into the gas cooler.

The flow of atmospheric air into the gas cooler must be carefully prevented because it may become the cause of an explosion of the CO contained in the waste gas, or at the least it may cause burning and thus reduce the fuel value of the waste gas.

However, when the waste gas volumetric flow rate is low the gas flow control valve will tend not to work with the proper sensitivity, and so in the initial and final stages of blowing some flow of atmospheric air into the gas cooler will have to be anticipated. As stated above, the risk of an explosion of the CO gas is largely due to oxygen containing gas such as atmospheric air coming into contact with the waste gas. And it has been the experience of the inventors in their recovery experiment used with a two ton converter that explosions occurred even with gas mixtures in which no explosion hazard could usually be anticipated.

Therefore, to insure safe and secure recovery of the waste gas, all precautionary steps should be taken to anticipate every conceivable cause of explosion.

An object of the present invention is, therefore, to provide a method in which the proportion of oxygen in the gas in the gas cooler is brought below the explosion hazard range by diluting the waste gas flowing into the gas cooler with an inert gas, nitrogen for example, the waste gas having the inert gas forcibly added during the initial and final stages of the blowing, and at the same time substantially increasing the volumetric flow rate of the gas flowing through the cooler and improving working sensitivity of the gas flow control valve, thereby stabilizing the control of the pressure within the cooler.

Another object of the present invention is to provide a method of collecting only the useful waste gas having a predetermined content of useful constituents, which method comprises starting oxygen blowing only after the atmosphere throughout the whole of the waste gas recovery system has been replaced with an inert gas, then maintaining the proportion of oxygen in the gas in the gas cooler below the explosion hazard range for the CO contained in the waste gas generated during blowing by mixing an inert gas into the waste gas, and then discharging the mixture of the waste gas and the inert gas.

Further objects of the present invention will become apparent from the following specification and claims, taken together with the accompanying drawing, in which;

Figure 1:
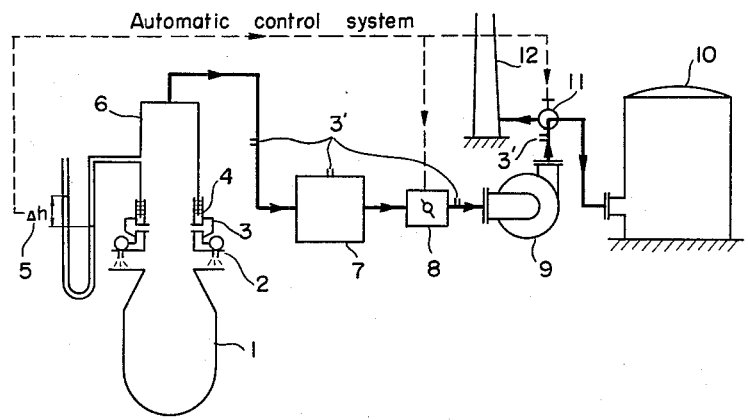
FIG. 1 is a diagramatic representation of the entire arrangement of the equipment for carrying out the method of this invention and showing the gas flow therethrough.

FIG. 6 is a known diagram showing an explosion range of CO gas when $H_2$ contained in the gas is below 2%. That is to say, in the diagram, in which the abscissa shows ($CO_2+N_2$) percent, while the ordinate ($CO+H_2$) percent, an area provided with oblique lines indicates an explosion range, prepared by plotting data obtained by one of the examples of this invention as mentioned afterwards and those obtained in the case this invention was not carried out, respectively.

The method of recovering the unburned waste gas according to this invention can be divided into four general steps:

(1) Before starting the blowing of pure oxygen into the iron bath charged into the converter, all gaps between the gas collection system and the furance throat are sealed with the curtain of inert gas, such as $N_2$ gas for example, to prevent air from entering the waste gas recovery system. Sealing of the aforesaid gaps can also be carried out by some other appropriate means without placing the overall method outside the scope of this invention.

(2) After the said gaps in the waste gas recovery system are sealed, introduction of an inert gas, $N_2$ for example, is started through inert gas inlets provided at appropriate places in the waste gas recovery system, and at the same time discharging of the gas from the system is commenced by means of a suction device in the system and the gas thus drawn from the system is discharged through a stack or a burning tower.

In this way, replacement of air in the waste gas recovery system by $N_2$ and discharge of the air is effected, and when the proportion of oxygen in the gases in the waste gas recovery system is reduced below the lower limit of the explosion hazard range of oxygen mixed with CO in the gas generated by the blowing, this condition can be detected by means of an oxygen detector provided in the pipe.

(3) As soon as the blowing of pure oxygen into the iron bath is started, the introduction of an inert gas ($N_2$ gas in the present example) for replacing the air in the waste gas recovery system is stopped and the blowing in of a sufficient amount of an inert gas to maintain the flow rate of the gas in the waste gas recovery system is started. The flow rate of the gas in the waste gas recovery system is required to be kept above a certain level in order to maintain a proper static pressure in the system and to maintain the correct flow rate of the gas in the system.

As the flow rate of the gas generated by the blowing increases, the flow rate of the inert gas blown in is gradually reduced, and when the flow rate of the generated gas reaches the level of the minimum correct flow rate or when the proportions of the gas compositions in the waste gas reach a predetermined relationship, the blowing in of the supplementary inert gas is stopped, and at the same time the waste gas recovery system is connected with the recovered waste gas container by switching a valve means. The gas flow rate or static gas pressure is measured by instruments. The gas flow rate can be appropriately changed according to the capacity of the waste gas recovery system. Thus, the gas issuing from the converter is collected in the recovered gas container.

Said switching of the valve means should be carried out at least after 4 minutes from the start of blowing or may be carried out by detecting $O_2$ content and CO content in the waste gas.

(4) As the flow rate of the generated gas during the final stage of the oxygen blowing drops below a given value, the blowing in of supplementary inert gas is resumed, and by switching the valve means, the mixture of waste gas and supplementary gas is discharged through the stack or burning tower. During this stage, as the volume of gas generated in the converter diminishes, the volume of inert gas is gradually increased to maintain the minimum flow rate, and thereafter all the intakes provided at several places in the waste gas recovery system are opened and the waste gas present in the waste gas recovery system is completely flushed out of the system, thus completing a cycle of the waste gas recovery operation. After the said generated gas is flushed out of the waste gas recovery system, blowing in of the inert gas can be stopped; but in order to prepare for the next gas recovery operation, supplementary inert gas can continue to be blown in just to keep out the atmospheric air, leakages of the inert gas in the system being prevented by blocking all inlets and exists in the waste gas recovery system.

Said switching of the valve means from the recovery system to the discharge system may be carried out before from 2 minutes and 30 seconds to 3 minutes from the moment where oxygen blowing is to be completed, because said moment may be decided beforehand.

In the drawings, FIG. 1 shows a converter 1, around the mouth of which is formed an inert gas curtain by a curtain forming means 2. A main diluting gas injection pipe 3 is positioned around the entrance to a gas cooler 6 on a vertically movable skirt 4 having a water seal between it and the gas cooler. A differential manometer 5 is provided to detect the gas pressure in the gas cooler 6. Downstream of the gas cooler 6 is connected a dust collector 7 followed by a gas flow control valve 8, for example a flap valve. A suction fan 9 has the intake side connected to the flap valve, and discharges into a three way switch valve 11 which in turn is connected to a waste gas holder 10 and gas burning tower or stack 12, respectively.

In order to have the waste gas discharged from the converter 1 flow into the gas cooler without coming into contact with the open atmosphere, the vertically movable skirt 4 and the gas curtain forming means 2 are provided to isolate the waste gas from the open atmosphere. The gas curtain forming means 2 forms a circular curtain of an inert gas, nitrogen for example, betwen the skirt and the converter throat. The joint between the gas cooler and the skirt has, as stated above, a water seal in order to make it possible to adjust the distance between the converter throat and the skirt depending upon the ability of the gas curtain to isolate the atmosphere. For example, when the curtain is powerful and high in isolating effect, the skirt can be raised to enlarge the opening, whereas if the curtain is weak and poor in isolating effect, the skirt can be lowered to make the opening smaller.

In the lower part of the cooler there is provided the main diluting gas injection pipe 3, and the diluting gas, for example nitrogen is forcibly mixed with the waste gas immediately after the latter is discharged from the converter by means of dozens of jet pipes provided around the inner periphery of the mouth of the cooler. Inert diluting gas is also supplied by the dilute gas jet pipes 3', installed at suitable places in the recovery system, in order to flush waste gas from the system to prevent explosion of the waste gas before and after the blowing. As pointed out above, the inert gas is supplied to the cooler to improve control action of the flow control valve and also to control the static pressure $\Delta h$ in the gas cooler at a positive static pressure of not over a few mm. of water column.

The pressure $\Delta h$ which is detected is transmitted to the flow control valve 8 and the automatic control system. The clean waste gas discharged from the blower 9 is discharged into the open atmosphere from the burning tower or stack 12 through the three way valve 11 during the period before and after the blowing and at the beginning and end of the blowing period when the gas is diluted and having a low content of useful gas. The undiluted useful gas generated during the peak period of the blowing is stored in gas container 10 through the three way valve 11.

Figure 2:
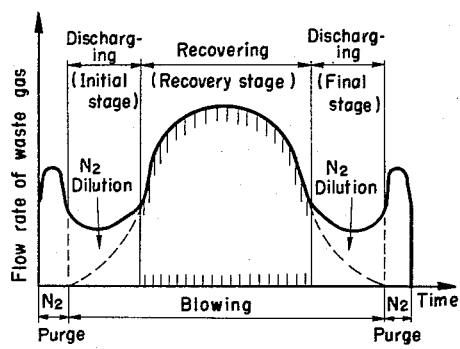
FIG. 2 is a graph showing process stages when carrying out one embodiment of the method of this invention, and FIG. 3 a chart showing the sequence of the steps in each stage shown in FIG. 2.
Figure 4:
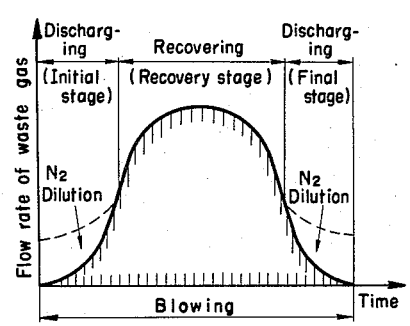
FIGS. 4 and 5 are graphs showing other embodiments of the method of this invention.

FIG. 2 is a graph showing the method of collecting waste gas in such an apparatus while carrying out waste gas dilution according to this invention.

In the initial and final stages of the oxygen blowing, the waste gas in the gas cooler has forcibly mixed with it an inert gas which dilutes the waste gas and also substantially increases the flow rate of the gas through the recovery system. It has been found that if the percentage of free oxygen in the gas passing through the waste gas recovery system during the oxygen blowing is kept less than half the percentage of CO in such gas, the danger of explosion is minimized. In gases in which there is about 1% $H_2$, a ratio of CO to $O_2$ of about 2:1 is the lower limit of the explosive hazard range. Since the $H_2$ content of the gas generated in the converter rises quite rapidly to this level, it is necessary to exclude air and supply enough nitrogen so that the percentage of free oxygen does not rise above half the percentage of CO.

As discussed briefly above, immediately after the start of oxygen blowing, there is a large excess of oxygen in the gas coming off the converter into the collection system, because it does not necessarily follow that ignition in the converter will start immediately after the start of oxygen blowing. It is also possible to take even about 2 minutes, particularly when the temperature in the converter is low, and it is some time, relatively speaking, before an appreciable amount of CO is generated. Since the amount of CO which is generated increases rapidly, and the amount of free oxygen which gets into the gas coming off the converter drops correspondingly, there is of course a point during the increases in percentage of CO and the decrease in the percentage of $O_2$ where there must be an explosive mixture. However, the amount of nitrogen which is added can be made great enough so that the mixture of gases is thoroughly diluted, and the hazard of an explosion in the very short time in which the percentages of CO and $O_2$ are within the explosive range is minimized.

It has also been found that there is a lower limit to the total gas flow through the gas recovery system, below which the flow control valve 8 will not function effectively to control the pressure of the gas within the cooler so that it can be kept positive with respect to the outside atmosphere during blowing, and negative at other times if desired.

Inventors have found that if nitrogen is added to the gas generated in the converter such that the total flow of gas entering the gas recovery system is kept at least ⅕–⅓ the maximum flow of gas generated in the converter, which is substantially all of the gas flowing through the gas recovery system at the peak of the generation of gas in the converter, all of the necessary conditions for safe and effective operation can be maintained. The lower limit of the explosion hazard range where there is about 1% hydrogen in the gas is where there is about 5.7% oxygen and about 15% CO. Immediately after the start of oxygen blowing there will be almost 50% oxygen in the gas generated in the converter, and this falls off at once when ignition begins and rapidly until there is less than 2% oxygen. On the other hand, there is no CO in the gas at the start of oxygen, and the percentage of CO increases rapidly until after about 4 min. from the start of blowing the percentage has reached about 30%. The hydrogen content of the generated gas quickly reaches between about 1 and 2% and stays there until the end of the oxygen blowing. Thus, the increasing CO rises rapidly above the minimum amount of 15% while the $O_2$ falls rapidly below the minimum amount, so that there is only a very short period in which the percentages are within the explosive hazard range for a gas with 1–2% hydrogen.

During the initial period of oxygen blowing, the control valve 8 in the recovery system is positioned so that a positive pressure is maintained in the gas recovery apparatus. This, together with the formation and maintenance of the gas curtain around the mouth of the converter effectively excludes atmospheric air from the recovery system. Because the total volume of gas generated increases as the oxygen blowing progresses, the amount of nitrogen to be added can be gradually reduced up to the time when the valve means are switched as prearranged.

Collection of the waste gas is begun when the amount of CO in the gas rises above 30%. Depending on the fuel value that it is desired to give to the recovered gas, the collection can begin anywhere between a CO content of 30% and 60%. As explained above, when collection is started, the three way valve 11 is changed so that instead of directing the gas flowing in the recovery system out through the burning tower or stack, it is directed into the container 10. At this time the total volume of generated converter gas has reached the minimum flow rate and the dilution with nitrogen can be discontinued.

Collection is continued until the proportion of CO in the waste gas falls off to between 60 and 30%. At the same time the total volume of waste gas generated in the converter falls off, so that it is again necessary to add nitrogen. However, the addition of the nitrogen is primarily to keep the flow rate above the lower limit, as well as to exclude atmospheric air which might cause burning in the recovery system. The amount of nitrogen added increases as the total volume of the generated waste gas decreases. If at the end of the oxygen blowing there is to be a long delay until the next oxygen blowing cycle, the skirt can be lifted from its position close to the mouth of the converter, and air can be drawn into the system. The diluted waste gas with low CO content which is in the system at the end of the oxygen blowing will not be adversely affected by the air thus drawn in, and there is little or no hazard of an explosion. The flow rate of the inert gas to be mixed into the total gas flow in the initial and final stages of the blowing, the mixing rate and the points at which the inert gas mixing is started and stopped can be determined in advance depending upon the capacity of the converter and can be placed under automatic control governed by the timer for the oxygen blowing, the means for detecting the contents of the waste gas, or the means for determining the waste gas flow rates.

In replacing unburned waste gas which may remain in the recovery system, the inert gas, nitrogen for example, entering the lower part of the cooler forces ahead of it the air remaining in the gas cooler, flue, dust collector, flue, blower and the three way switch valve one after another in the said order. A slug of inert gas is thus positioned between the waste gas being forced out of the system by the purging nitrogen and the hot waste gases coming into the system behind the purging nitrogen. From the experience of the inventors, when the present equipment is installed with a converter of about 130 tons capacity, it was found that replacing of all of air in the system required about 15–20 seconds, and during this time the supply of nitrogen must be continued for purging. Therefore, sufficient nitrogen for purging must be available, preferably with a surplus of a given percentage or several times of the capacity of the whole recovery system.

However, because of the dead spaces existing in some parts of the waste gas system, it will be very difficult to purge the air remaining in said zones merely by the nitrogen flow. It is therefore desirable to provide means for locally replacing air with nitrogen in all dead spaces in the recovery system. Such means injects nitrogen for example from supplementary diluting gas injection pipes 3′ positioned at such dead spaces.

Moreover, if the inert gas, nitrogen for example, for use in the said explosion preventing purge is obtained as a byproduct of the process of separating oxygen for blowing and nitrogen from the air and its supply is limited because of the capacity of the separator, the production cost of nitrogen cannot be overlooked and consumption must be reduced as much as possible. Therefore, the time of starting the injection of nitrogen into said dead spaces from the supplementary diluting gas jet pipes should be delayed in proportion to the distance the particular dead space is located from the gas cooler so that the supplementary purge is not commenced until just slightly before the main nitrogen flow from the main nitrogen purge jet pipe in the lower part of the gas cooler reaches the dead space. If the duration of the injection of supplementary diluting gas can be regulated by connecting the injection means with the automatic control system for operating the recovery equipment for allowing sufficient time to complete replacing of the air in the system with nitrogen, consumption of nitrogen during the purging can be greatly reduced.

FIG. 2 is graph showing the flow rate of the unburned waste gas in the recovery system plotted against time for the method according to this invention. In this example, oxygen blowing was started only after the whole recovery system was purged with an inert gas, and in the initial stage of the blowing the inert gas was added for dilution of the waste gas.

The flow rate of the inert gas to be mixed into the generated gas during the initial and final stages of the oxygen blowing, the rate of mixing, and the points at which mixing of the inert gas is to be started and stopped, and the times for the operation of the three way valve, and the desired flow rate can be determined in advance according to the capacity of the converter, and automatic control by means of a timer corresponding to the blowing, the contents of waste gas or the waste gas flow rate can be used to facilitate the recovery operation.

Because the production cost of the nitrogen cannot be overlooked, and it is highly important to reduce nitrogen consumption by improving the refining efficiency by shortening as much as possible the time for one refining cycle in order to reduce the per ton production cost of steel. From the above point of view, the method of the present invention can be carried out in such a way that a part or all of the processes of purging and dilution by means of the inert gas are concurrently performed so that the aforesaid requirements are fulfilled by a single operation.

Figure 5:
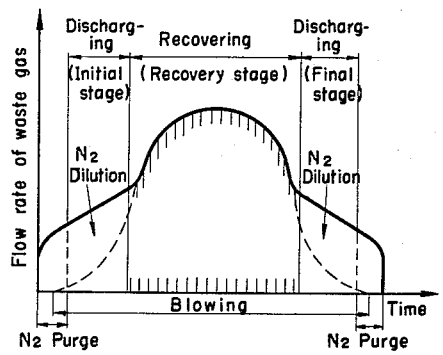

FIG. 5 is a graph showing the flow rate of the unburned waste gas in the recovery system plotted against time in an experiment where purging and diluting with inert gas were performed concurrently and oxygen blowing was started during the course of purging. The same procedures were carried out in the final stage of the blowing.

FIG. 3 is the chart showing the sequence of steps during operation of the equipment according to the method of the present invention.

From FIG. 3 it will be seen that the suction blower is run throughout the complete cycle, preferably at a constant speed, control of the flow of gas being achieved by operation of the damper 8. Also the supply nozzle for nitrogen or other inert gas to flood the system in case of an emergency shut down is left on during the entire cycle, although passage of such gas into the system is prevented by the emergency control system (not shown). The nozzles for nitrogen or other inert gas for purging or flushing the system prior to the oxygen blowing are opened only during the displacement period, and are then shut off. The nozzles supplying nitrogen or inert gas for dilution are opened at the start of the blowing period and shut off after the proportion of CO in the waste gas reaches the predetermined amount. These nozzles are opened again when the proportion of CO in the waste gas again falls to the predetermined amount, and are then shut off at the end of the oxygen blowing. The oxygen for blowing is supplied throughout the blowing period, being shut off only when the system is being purged between blowing cycles. The three way valve 11 is set to discharge gas coming through the system to the stack or burning tower during the purging period and during the initial part of the blowing period, and is switched over to direct the gases coming through the system to the collection tank 10 after the proportion of CO in the gas reaches the predetermined amount. The valve is switched back to the discharge position when the proportion falls to the predetermined amount and remains there throughout the remainder of the cycle.

Table shows the compositions of waste gases obtained by one of the examples of the method of this invention and those obtained in the case in which nitrogen dilution has not been carried out. A, B, C, D and E designate the time elapsed from the start of oxygen blowing, respectively, as of 0 minute, 0 minute and 45 seconds, 1 minute, 1 minute and 30 seconds and 2 minutes in the case of carrying out nitrogen dilution, and $a$, $b$, $c$, $d$ and $e$ the corresponding time elapsed, respectively, in the case of carrying out no nitrogen dilution.

These values of mixed gases at each time have been plotted in FIG. 6.

TABLE

|  | Composition of waste gas (percent) | | |
| --- | --- | --- | --- |
|  | $CO+H_2$ | $CO_2+N_2$ | $O_2$ |
| $N_2$-dilution: | | | |
| A | 1.0 | 53.5 | 45.0 |
| B | 8.0 | 62.0 | 30.0 |
| C | 10.0 | 70.0 | 20.0 |
| D | 15.5 | 75.0 | 9.5 |
| E | 27.6 | 71.4 | 1.0 |
| Without $N_2$-dilution: | | | |
| $a$ | 1.8 | 19.2 | 79.0 |
| $b$ | 15.5 | 26.6 | 57.9 |
| $c$ | 18.0 | 46.0 | 36.0 |
| $d$ | 30.4 | 51.0 | 18.6 |
| $e$ | 50.5 | 47.7 | 1.8 |

As evidently seen from FIG. 6, the values obtained by the method of this invention, in which nitrogen dilution has been carried out, are all out of the explosion range, while those obtained by the method without nitrogen dilution are within the explosion area. Even pending the tests made by the inventors an explosion of small scale has been experienced when no nitrogen dilution was carried out.

*Example*

In the following will be shown an example for operation with a full scale commercial converter.

OPERATIONAL CONDITIONS

|  | Tons |
| --- | --- |
| Total amount of charge | 156.2 |
| Amount of hot metal | 114.1 |
| Amount of molten steel | 130.4 |

CHEMICAL ANALYSIS

|  | C (percent) | Si (percent) | MN (percent) | P (percent) | S (percent) | Temp., °C. |
|---|---|---|---|---|---|---|
| Hot metal charged | 4.20 | 0.67 | 0.85 | 0.126 | 0.028 | 1,320 |
| Molten steel in the bath (at blow end) | 0.05 | Trace | 0.20 | 0.016 | 0.015 | 1,605 |

Flow rate of $O_2$ during blowing 17,000 Nm.$^3$/H constant.

Pressure in the cooler hood +2 mm. water column.

an inert gas, and while the purging is still incomplete, starting the oxygen blowing in the converter mixing into the waste gas produced at the start of the oxygen blow-

| Time after starting $O_2$ blowing (min.) | Skirt height (mm.) | $O_2$ flow rate, Nm.$^3$/H | $N_2$ flow rate (Nm.$^3$/H.) | | Waste gas flow rate, Nm.$^3$/H | Gas generating rate,* Nm.$^3$/H | Press in the hood (mm. water) | Analysis of gas (percent) | | | | | Gas recovering | Remarks |
|---|---|---|---|---|---|---|---|---|---|---|---|---|---|---|
| | | | Purge and dilut. | Curtain | | | | CO | $CO_2$ | $N_2$ | $O_2$ | $H_2$ | | |
| −1 | 50 | 0 | 23,000 | 3,000 | 24,000 | 0 | +3 | 0.2 | 2.5 | 94.0 | 3.2 | 0 | x | $N_2$ purge start, 1 min. before $O_2$ start. |
| 0 | 50 | 17,000 | 14,000 | 5,000 | 23,000 | (11,500) | +4 | 0.5 | 3.5 | 50.0 | 45.5 | 0.5 | x | |
| 0.45 | 50 | 17,000 | 14,000 | 5,000 | 29,000 | (14,000) | +4 | 7.5 | 10.0 | 52.0 | 30.0 | 0.5 | x | $O_2$ ignition 45 sec. after start of $O_2$ blowing. |
| 1 | 50 | 17,000 | 12,000 | 5,000 | 27,000 | (11,500) | +4 | 9.5 | 12.5 | 58.0 | 20.0 | 0.5 | x | |
| 1.30 | 50 | 17,000 | 12,000 | 5,000 | 24,500 | (10,000) | +2 | 15.0 | 15.0 | 60.0 | 9.5 | 0.5 | x | |
| 2 | 50 | 17,000 | 10,000 | 5,000 | 22,000 | (10,500) | +2 | 26.6 | 16.4 | 55.0 | 1.0 | 1.0 | x | |
| 4 | 50 | 17,000 | 8,000 | 5,000 | 24,000 | (16,000) | +2 | 43.4 | 19.6 | 34.4 | 0.3 | 1.8 | x | |
| 6 | 50 | 17,000 | 0 | 5,000 | 27,000 | (25,500) | +1 | 69.6 | 23.3 | 5.9 | 0.1 | 1.1 | x | Gas recovery started, 5 min. 30 sec. after start of $O_2$ blowing and ended 22 min. 15 sec. after start of $O_2$ blowing. |
| 8 | 50 | 17,000 | 0 | 5,000 | 35,000 | (33,500) | +2 | 73.3 | 21.3 | 4.2 | 0.2 | 1.0 | x | |
| 10 | 50 | 17,000 | 0 | 5,000 | 40,000 | (38,800) | +2 | 78.0 | 17.2 | 3.3 | 0.4 | 1.1 | x | |
| 12 | 50 | 17,000 | 0 | 5,000 | 50,000 | (48,000) | +2 | 81.15 | 13.4 | 3.7 | 0.3 | 1.1 | x | |
| 14 | 50 | 17,000 | 0 | 5,000 | 55,000 | (54,000) | +3 | 72.9 | 18.3 | 1.2 | 0.2 | 1.3 | x | |
| 16 | 50 | 17,000 | 0 | 5,000 | 38,500 | (36,500) | +1 | 81.4 | 12.4 | 5.1 | 0.2 | 0.9 | x | |
| 18 | 50 | 17,000 | 0 | 5,000 | 33,000 | (31,500) | +2 | 82.7 | 11.3 | 5.1 | 0 | 0.9 | x | |
| 20 | 200 | 17,000 | 8,000 | 3,000 | 32,000 | (30,500) | 0 | 85.7 | 9.4 | 4.7 | 0 | 0.9 | x | $O_2$ value closed 23 min. 50 sec. after start of $O_2$ blowing. |
| 22 | 400 | 17,000 | 10,000 | 0 | 36,000 | (26,000) | −1 | 62.8 | 7.6 | 28.5 | 0.2 | 0.9 | x | |
| 24 | 500 | 0 | 14,000 | 0 | 37,000 | (9,000) | −1 | 14.9 | 8.8 | 75.4 | 0 | 0.9 | x | |

*Value of the gas generating rate from converter are calculated from waste gas flow rate and composition of the gas.

What is claimed is:

1. A method of recovering in a waste gas collecting system the unburned combustible waste gas produced by blowing pure oxygen into an oxygen top blowing converter for refining molten pig iron, said method comprising the steps of mixing into the waste gas produced at the start of the oxygen blowing in the converter an amount of an inert gas sufficient to bring the total amount of gas up to ⅕–⅓ the maximum amount of gas generated in the converter for maintaining sufficient gas flow for keeping the collection system stable and diluting the gas from the converter sufficiently to minimize the hazard of an explosion, gradually decreasing the amount of inert gas added to the waste gas as the amount of waste gas from the converter increases until the amount of CO present in the waste gas coming from the converter rises to a predetermined minimum, discharging the mixture of waste gas and inert gas into the atmosphere, discontinuing the mixing of the inert gas when the amount of CO present in the waste gas from the converter reaches said predetermined minimum and then collecting the waste gas produced in the converter during the time the amount of CO remains above the said predetermined minimum, and when the amount of CO in the waste gas drops below said predetermined minimum, adding an inert gas to the waste gas in gradually increasing amounts up to said ⅕–⅓ the maximum amount of generated gas for keeping the collection system stable until the end of the oxygen blowing in the converter, and discharging said mixture of inert gas and waste gas to the atmosphere.

2. The method as claimed in claim 1 in which said predetermined minimum amount of CO in the waste gas is from 30–60%.

3. A method of recovering in a waste gas collecting system the unburned combustible waste gas produced by blowing pure oxygen into an oxygen top blowing converter for refining molten pig iron, said method comprising the steps of purging the collection system with an inert gas, and while the purging is still incomplete, starting the oxygen blowing in the converter mixing into the waste gas produced at the start of the oxygen blowing an amount of inert gas sufficient to bring the total amount of gas up to ⅕–⅓ the maximum amount of gas generated in the converter for maintaining sufficient gas flow for keeping the collection system stable and diluting the gas from the converter sufficiently to minimize the hazard of an explosion, gradually decreasing the amount of inert gas added to the waste gas as the amount of waste gas from the converter increases until the amount of CO present in the waste gas coming from the converter rises to a predetermined minimum, discharging the mixture of waste gas and inert gas into the atmosphere, discontinuing the mixing of the inert gas when the amount of CO present in the waste gas from the converter reaches said predetermined minimum and then collecting the waste gas produced in the converter during the time the amount of CO remains above the said predetermined minimum, and when the amount of CO in the waste gas drops below said predetermined minimum, adding an inert gas to the waste gas in gradually increasing amounts up to said ⅕–⅓ the maximum amount of generated gas for keeping the collection system stable until the end of the oxygen blowing in the converter and discharging said mixture of inert gas and waste gas to the atmosphere.

4. A method as claimed in claim 3 in which the inert gas for purging is first introduced at the upstream end of the waste gas recovery system and as the said purging gas flow through the system, injecting purging gas into dead zones in the system as the inert purging gas reaches said dead zones for insuring purging of the dead zones with a minimum usage of waste gas.

References Cited by the Examiner
UNITED STATES PATENTS 3,084,039   4/1963   Baum _____ 75—60
3,111,400   11/1963  Hoff _____ 75—60
3,134,835   5/1964   Okaniwa _____ 75—60

BENJAMIN HENKIN, *Primary Examiner.*